United States Patent
Kraft

(10) Patent No.: US 7,302,489 B2
(45) Date of Patent: Nov. 27, 2007

(54) SYSTEMS AND METHODS FOR SYNCHRONIZING DATA OBJECTS AMONG PARTICIPATING SYSTEMS VIA ASYNCHRONOUS EXCHANGE OF MESSAGES

(75) Inventor: Frank Michael Kraft, Speyer (DE)

(73) Assignee: SAP AG, Walldorf (DE)

( * ) Notice: Subject to any disclaimer, the term of this patent is extended or adjusted under 35 U.S.C. 154(b) by 1021 days.

(21) Appl. No.: 10/632,675

(22) Filed: Aug. 1, 2003

(65) Prior Publication Data

US 2005/0027811 A1   Feb. 3, 2005

(51) Int. Cl.
G06F 15/16 (2006.01)
G06F 9/46 (2006.01)
G06F 12/00 (2006.01)

(52) U.S. Cl. ............... 709/230; 709/206; 709/218; 707/201; 705/8; 705/37

(58) Field of Classification Search ............. None
See application file for complete search history.

(56) References Cited

U.S. PATENT DOCUMENTS

| | | |
|---|---|---|
| 4,694,422 A | 9/1987 | Kakuda et al. |
| 4,777,595 A | 10/1988 | Strecker et al. |
| 5,655,075 A | 8/1997 | Saito et al. |
| 5,842,216 A | 11/1998 | Anderson et al. |
| 5,864,837 A | 1/1999 | Maimone |
| 5,974,129 A | 10/1999 | Bodnar |
| 6,212,653 B1 | 4/2001 | Boivin et al. .......... 714/45 |
| 6,415,315 B1 | 7/2002 | Glass |
| 6,442,586 B1 | 8/2002 | Glass |
| 6,529,932 B1 | 3/2003 | Dadiomov et al. |
| 6,564,218 B1 | 5/2003 | Roth |
| 6,631,386 B1 | 10/2003 | Arun et al. |

(Continued)

FOREIGN PATENT DOCUMENTS

| | | |
|---|---|---|
| EP | 0 684 720 A | 11/1995 |
| EP | 0 926 608 A | 6/1999 |

OTHER PUBLICATIONS

Bosik, B.S., et al., "Finite State Machine Based Formal Methods in Protocol Conformance Testing: From Theory to Implementation," *Computer Networks and ISDN Systems*, North Holland Publishing, Amsterdam, NL, vol. 22, No. 1, Aug. 1, 1991, pp. 7-33, XP00224436.

(Continued)

*Primary Examiner*—Wen-Tai Lin
(74) *Attorney, Agent, or Firm*—Buckley, Maschoff & Talwalkar LLC

(57) ABSTRACT

A computer-implemented method of, and system for, messaging in a computer network is disclosed. The computer network comprises at least two computer-based participant systems communicating through asynchronous exchange of messages. The first system maintains one or more data objects and notifies another system of modifications of the data objects by sending messages. Each time a data object is modified, the corresponding status object is updated and a modification status flag is checked. In response, a communication status flag is checked and a notification message is sent to the other system if necessary. The modification status flag is then reset. Upon receipt of a confirmation message from the other system, the communication status flag is then reset to the original status.

9 Claims, 3 Drawing Sheets

U.S. PATENT DOCUMENTS

| | | | |
|---|---|---|---|
| 6,718,347 B1* | 4/2004 | Wilson | 707/201 |
| 6,738,797 B1 | 5/2004 | Martin | |
| 6,754,657 B2 | 6/2004 | Lomet | |
| 6,761,636 B2 | 7/2004 | Chung et al. | |
| 6,952,660 B1 | 10/2005 | Matheson | 703/1 |
| 7,082,458 B1* | 7/2006 | Guadagno et al. | 709/204 |
| 2003/0101235 A1* | 5/2003 | Zhang | 709/218 |
| 2004/0098292 A1* | 5/2004 | Miller et al. | 705/8 |

OTHER PUBLICATIONS

"Analysis of Petri Net Performance Model," http://www.document.ic.ac.uk/~nd/surprise_95/journal/vol2/nr1/article2.html, printed from the Internet Sep. 5, 2003, 2 pgs.

Brink, Richard Scott, "A Petri Net Design, Simulation, and Verification Tool," Rochester Institute of Technology, Sep. 1996, http://www.csh.rit.edu/~rick/thesis/document/PetriThesis.html, printed from the Internet Sep. 5, 2003, 47 pgs.

Carryer, J. Edward, "State Machines," Feb. 2, 2001, http://design.stanford.edu/spdl/eel18/pdf_files/StateMachines.pdf, printed from the Internet Sep. 5, 2003, 3 pgs.

"DotnetCoders—UML: Statechart Diagrams," copyright 2000-2003 .netCoders, http://www.dotnetcoders.com/web/learning/uml/diagrams/statechart.aspx, printed from the Internet Dec. 10, 2003, 2 pgs.

"Finite State Machine—A WhatIs Definition," http://whatis.techtarget.com/definition/0,,sid9_gci213052,00.html, printed from the Internet Dec. 10, 2003, 4 pgs.

'Half.com: Apple iPod Mini—Questions & Answers' [online]. half.com by ebay, undated materials, [retrieved on Mar, 7, 2005]. Retrieved from the Internet: <URL: http://half.ebay.com/cat/buy/ask_question.cgi?offer_ed=1286774759&meta_id=6&domain_id=447>.

'Half.com: Apple iPod Mini—Seller's Description' [online]. half.com by ebay, undated materials, [retrieved on Mar. 6, 2005]. Retrieved from the Internet: <URL:http: //half.ebay.com/cat/buy/inv.cgi?offerid=1286774759&meta_id=6&cpid=1202509735&domain_id=447>.

'The Next Evolution of E-Commerce—Tango Trade Press Release' [online]. Undated materials, [retrieved initially, in part, on Mar. 7, 2005, then again in its entirety on Apr. 28, 2005]. Retrieved from the Internet: <URL: http://www.p2p-zone.com/underground/showthread.php?s=&threadid=16211>. See, e.g., pp. 10-11.

'P2P Real Time Trading Community from Tango' [online]. Undated materials, [retrieved initially, in part, on Mar. 7, 2003; then again in its entirety on Apr. 28, 2005]. Retrieved from the Internet: <URL: http://www.collaborate.com/publication/newsletter/n10603.html#portal>. See, e.g., pp. 24-25.

"StateMachines," copyright 1996-2002 BoldSoft, copyright 2002 Borland, http://information.borland.com/techpubs/delphi/boldfordelphi/html/Mech_StateMachines.htm, printed from the Internet Sep. 5, 2003, 1 pg.

'TangoTrade.net—About' [online]. Tango, undated materials, [retrieved on Mar. 16, 2005]. Retrieved from the Internet: <URL: http://www.tangotrade.net/about,html>.

'Tango Trade 2.0: End-User Market for: EBAY P/N 370-2304' [online]. Tango, undated materials, [retrieved on Mar. 7, 2005]. Retrieved from the Internet: <URL: http://rook.tangotrade.net/live/bidask.php?Item=370-2304&ManuName=EBAY>.

'Tango Trade 2.0: Sell an Item' [online]. Tango, undated materials, [retrieved on Mar. 7, 2005]. Retrieved from the Internet: <URL: http://dns-1.wtic.net/sell.php?&PHPAUCTION_SESSION=9182eb870919298ff76e18a31b0a7635>.

"UML Tutorial—State Diagrams," Kennesaw State University, http://pigseye.kennesaw.edu/~dbraun/csis/4650/A&D/UML_tutorial/state.htm, printed from the Internet Dec. 10, 2003, 4 pgs.

'Welcome to TangoTrade.net' [online]. Tango, undated materials, [retrieved on Mar. 7, 2005]. Retrieved from the Internet: <URL: http://www.tangotrade.net/index.html>.

Haase, Kim, "Java Message Service API Tutorial," Sun Developer Network Site, Aug. 2001, retrieved from the Internet on Jan. 7, 2004, at http://java.sun.com/products/jms/docs.htm, XP002266306, 270 pgs.

Johnson, David B. et al., "Sender-Based Message Logging," 7th Symposium on Fault-Tolerant Computing, 1987, retrieved from the Internet on Jan. 8, 2004, at http://citeseer.nj.necessary.com/johnson87senderbased.html, XP002266307, 6 pgs.

Kakuda, Yoshiaki, et al., "Automated Verification of Responsive Protocols Modeled by Extended finite State Machines," Real-Time Systems, Kluwer Academic Publishers, Dordrecht, NL, vol. 7, No. 3, Nov. 1, 1994, XP 000485229, pp. 275-289.

Yuang, Maria C., "Survey of Protocol Verification Techniques Based on Finite State Machine Models," Apr. 11, 1988, Proceedings of the IEEE NBS Computer Networking Symposium, Washington, DC, XP010011847, pp. 164-172.

* cited by examiner

SYSTEMS AND METHODS FOR SYNCHRONIZING DATA OBJECTS AMONG PARTICIPATING SYSTEMS VIA ASYNCHRONOUS EXCHANGE OF MESSAGES

FIELD OF THE INVENTION

The present invention generally relates to methods of, and systems for, messaging in a computer network. More particularly, the invention relates to methods and systems where user modifications of one or more data objects maintained by a first participant system of the computer network are communicated to at least one other participant system of the computer network according to certain criteria.

BACKGROUND OF THE INVENTION

In distributed computer networks, communication between the various distributed participant systems of the network is often through asynchronous exchange of messages. In asynchronous messaging, software program applications send and consume messages. The message exchange is asynchronous in that an application sending a message does not need to wait for a remote application to receive that message. Thus, there is no need for all elements of the infrastructure linking the computers on which the applications are run to be available at all times.

Generally, communication between participant systems of a distributed computer network can be according to a pessimistic communication protocol or an optimistic communication protocol. As an example, a computer system of a purchaser of goods may run a software program application that allows the purchaser to electronically place a purchase order. The purchase order application generates and stores locally a first data object representing the order, and effects sending of a message containing the data object, i.e., the order, via the computer network to an order processing software program application run on another computer system at the site of a supplier of the requested goods. The order processing application handles and processes incoming orders. Once the order processing application receives a new purchase order, it creates and stores locally a second data object that corresponds to the first data object.

In practice it frequently happens that a purchaser, after having successfully placed an order with a supplier, wishes to change (modify) his order, for example, because the quantity or size of the required goods has changed. Thereafter, the purchaser may wish to modify his order a second time, and perhaps yet even more times.

If a pessimistic communication protocol is used for communication between the purchaser and supplier systems, a modification of the order by the purchaser is allowed only until after a confirmation message sent from the supplier system has been received by the purchaser system in response to an earlier modification. In other words, the purchaser, who has just entered a modification into his system, has to wait until a message (answer) confirming receipt of the modification is received from the supplier system, before he is allowed to enter another modification. The supplier's confirmation can be positive (he accepts the modification) or negative (he rebuffs the modification). On the other hand, if an optimistic communication protocol is used, the purchaser can enter a modification of his order even before having received a confirmation of an earlier modification from the supplier system.

Pessimistic communication protocols are usually employed where conflicts between the participant systems may easily occur, e.g., where a supplier is not sufficiently flexible to respond to late modifications of an order short before start of a production run or to handle plural modifications within a short period of time. For example, if an order is sent from a purchaser to an outside supplier, modifications of the order are likely to be acceptable for the supplier only well before execution of the order. This is particularly true if the purchaser and supplier resort to software products from different providers for handling their electronic business matters. A standard pessimistic communication protocol often used in today's world of electronic commerce is, e.g., RosettaNet.

An optimistic communication protocol is convenient in a situation where the supplier is highly flexible and able to react on modifications of an order even short before commencing execution of the order. This is often true where purchaser and supplier, or more generally collaborating business partners, rely on software products from the same software provider using similar or the same standards, procedures, interfaces, data structures, instruction sets, etc. It is also determinative for the choice of the type of communication protocol used whether or not the systems are able to store and visualize process conflicts as part of their data design and business process.

When designing and programming a scheme for the communication between participant systems of an asynchronous messaging computer network, a software developer, or a team of developers, hitherto face a dilemma of choosing whether to implement an optimistic protocol or a pessimistic protocol. Voting for an optimistic communication protocol implies forgoing the openness of a pessimistic communication environment, i.e., the possibility of having most diverse software systems of different manufacturers collaborate through a computer network. Electing a pessimistic communication protocol means waiving flexibility and ease of use of an optimistic communication environment. Thus, it is highly desirable to have a communication protocol that preserves both openness of a pessimistic system and customer friendliness of an optimistic system.

SUMMARY OF THE INVENTION

The present invention provides in one aspect a computer-implemented method of messaging in a computer network, the computer network comprising a plurality of at least two computer-based participant systems communicating through asynchronous exchange of messages, a first one of the participant systems maintaining one or more data objects, the first participant system arranged to send messages to at least one other participant system to notify said other participant system of modifications of said one or more data object entered through the first participant system, the method comprising the steps of: providing a status object in relation to each data object, the status object comprising one or more status fields for storing information representative of at least one of a delta value applied to the respective data object as a result of one or more modifications and a total value of that data object after application of the one or more modifications; providing a modification status flag in relation to each data object; providing a communication status flag in relation to each data object; each time a modification of a respective data object is entered, updating the respective status object so as to reflect the modification, and checking the respective modification status flag; if it is determined that the modification status flag indicates a first modification status, setting the modification status flag to a second modification status; in response to setting the modification status flag to the second modification status, checking the respective communication status flag; if it is determined that the communication status flag indicates a first communication status, retrieving the respective status object and sending a notification message containing the retrieved status object from the first participant system to the other participant system; upon sending of the notification message, setting the respective communication status flag to a second communication status and resetting the respective modification status flag to the first modification status; and upon receipt of a confirmation message from the other participant system by the first participant system, resetting the respective communication status flag to the first communication status, the confirmation message confirming receipt of the notification message by the other participant system.

In another aspect, the present invention provides a computer-implemented system for messaging in a computer network, the system comprising a first computer adapted to run one or more software program applications in accordance with inputs, the first computer provided with a computer program product providing computer-executable program code that, when loaded into the computer, causes the first computer to: provide a status object in relation to each of one or more data objects maintained by said one or more software program applications, the status object comprising one or more status fields for storing information representative of at least one of a delta value applied to the respective data object as a result of one or more modifications entered by said user and a total value of that data object after application of the one or more modifications; provide a modification status flag in relation to each data object; provide a communication status flag in relation to each data object; each time a modification of a respective data object is entered, update the respective status object so as to reflect the modification, and check the respective modification status flag; if it is determined that the modification status flag indicates a first modification status, set the modification status flag to a second modification status; in response to setting the modification status flag to the second modification status, check the respective communication status flag; if it is determined that the communication status flag indicates a first communication status, retrieve the respective status object and send a notification message containing the retrieved status object to at least one second computer; upon sending of the notification message, set the respective communication status flag to a second communication status and reset the respective modification status flag to the first modification status; and upon receipt of a confirmation message from the second computer, reset the respective communication status flag to the first communication status, the confirmation message confirming receipt of the notification message by the second computer.

The present invention is based on a pessimistic global approach in that it requires, after sending of a notification message by the first participant system, receipt of a confirmation message from the other participant system before allowing the first participant system to send a next notification message. At the same time, the invention supports an optimistic local (internal) approach in that it allows a user to enter modifications at a time of his choosing, without requiring the user to wait for earlier modifications to be confirmed. In this way, advantages such as tolerance and flexibility of optimistic communication protocols and advantages such as openness of pessimistic communication protocols can be combined.

The status object is updated each time a modification is entered regardless of whether or not the pessimistic protocol used for communication between the participant systems allows sending of a notification message. Thus, in a case where a user makes multiple changes to a data object, the information contained in the status object reflect these multiple changes. Once the pessimistic protocol allows sending of a notification message (as indicated by the communication status flag being set to the first communication status), the current object status is read, which may be comprised of plural modifications. In this way, multiple modifications can automatically aggregate to one notification message.

The modification status flag indicates whether or not the respective data object is in a modified state that is yet to be communicated to the other participant system. Specifically, the first modification status indicates that the data object is either in its initial state or that any modifications of the data object have already been communicated to the other participant system. On the other hand, the second modification status indicates that the data object has been changed but no notification message has yet been sent that includes the respective change.

Checking a respective communication status flag preferably includes repeating checking that communication status flag if it is determined that the communication status flag indicates the second communication status, until it is determined that the communication status flag indicates the first communication status.

In a preferred embodiment, a first display item is presented on a display of a graphical output device in relation to every data object of which the modification status flag indicates the second modification status. Also, a respective second display item can be presented on the display in relation to at least one first display item, the second display item indicating part or all of the information contained in the status object of the corresponding data object. In this way, a graphical user interface can be generated that allows the user to keep himself informed of which modified data object(s) have still to be communicated to the other participant system.

In yet another aspect, the present invention provides a computer program product providing computer-executable instructions that, when executed by a computer, cause the computer to: provide a status object in relation to each of one or more data objects maintained by one or more software program applications running on the computer, the status object comprising one or more status fields for storing information representative of at least one of a delta value applied to the respective data object as a result of one or more modifications entered by a user of the computer and a total value of that data object after application of the one or more modifications; provide a modification status flag in relation to each data object; provide a communication status flag in relation to each data object; each time a modification of a respective data object is entered, update the respective status object so as to reflect the modification, and check the respective modification status flag; if it is determined that the modification status flag indicates a first modification status, set the modification status flag to a second modification status;

in response to setting the modification status flag to the second modification status, check the respective communication status flag; if it is determined that the communication status flag indicates a first communication status, retrieve the respective status object and send a notification message containing the retrieved status object to at least one other computer; upon sending of the notification message, set the respective communication status flag to a second communication status and reset the respective modification status flag to the first modification status; and upon receipt of a confirmation message from the other computer, reset the respective communication status flag to the first communication status, the confirmation message confirming receipt of the notification message by the other computer.

BRIEF DESCRIPTION OF THE DRAWINGS

Further objects, features, and advantages of the present invention will become apparent from the following description taken in conjunction with the accompanying drawings in which.

DETAILED DESCRIPTION OF THE DRAWINGS

Figure 1:
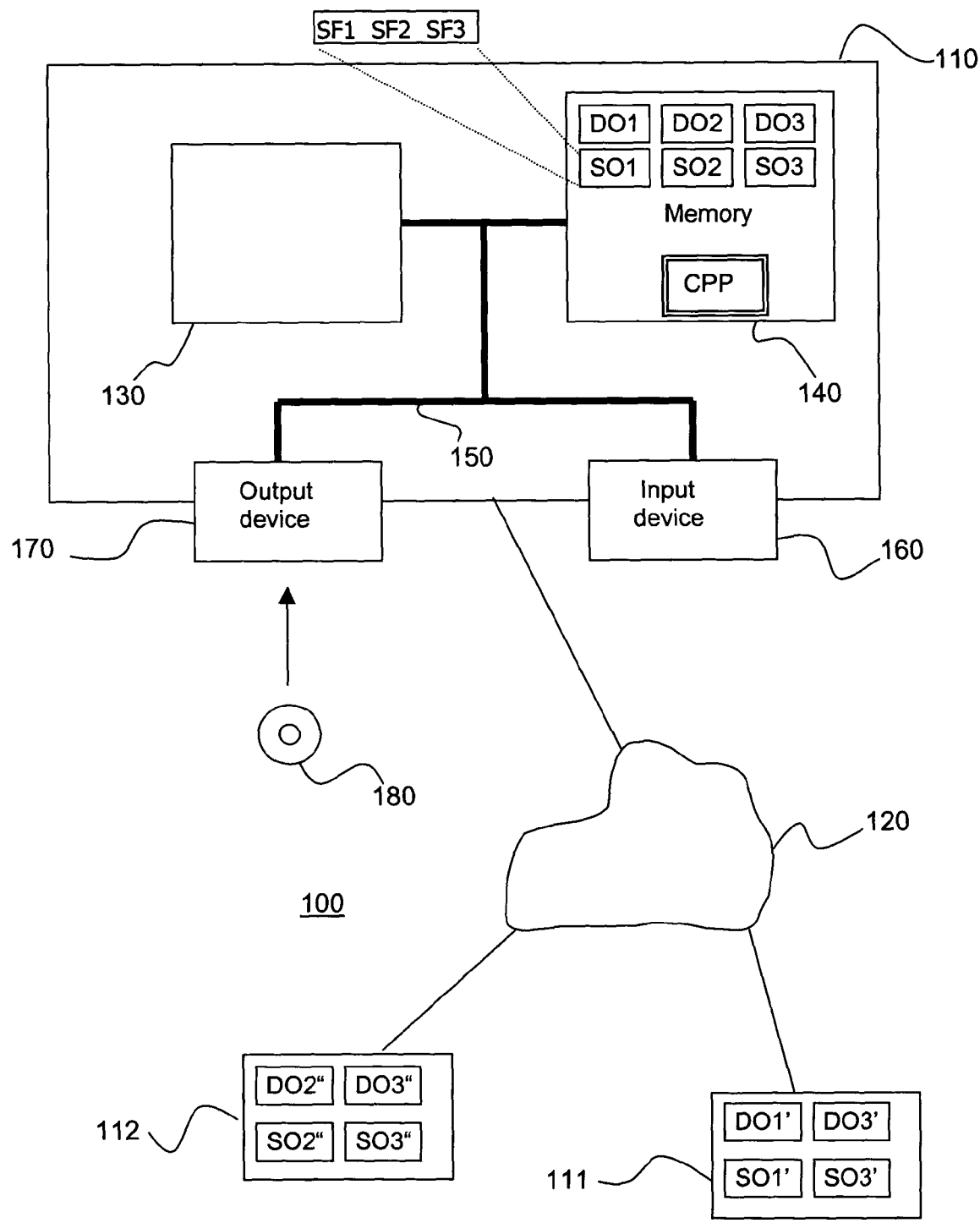
FIG. 1 is a schematic diagram illustrating an asynchronous messaging computer system according to one embodiment of the present invention.

FIG. 1 illustrates a simplified block diagram of a distributed computer system 100 that comprises a plurality of at least two loosely coupled computer stations 110, 111, 112 . . . linked to each other via a network 120. Computer stations 110, 111, 112 . . . communicate over network 120 through asynchronous exchange of messages. Computer station 110 comprises a processor 130, a memory 140, a bus 150, and one or more input devices 160 and output devices 170 acting as user interface. The components of computer station 110 interoperate in a manner conventionally known in the art. Typically, computer stations 111, 112 . . . will have similar components as computer station 110. Hence, components 130-170 of computer station 110 may collectively illustrate corresponding components in other computer stations connected to network 120. Computer stations 110, 111, 112 . . . are also referred to as remote computers. They can, e.g., be servers, routers, peer devices, or other common network nodes.

Computer station 110 can, e.g., be a desktop personal computer, a laptop or notebook computer, a workstation, a minicomputer, a multiprocessor computer, a mainframe computer, a mobile computing device, a programmable personal digital assistant, or the like. Processor 130 can, for example, be a central processing unit (CPU), a digital signal processor (DSP), a micro-controller, or the like.

Memory 140 symbolizes components that allow to store data and/or instructions permanently or temporarily. Although memory 140 is illustrated in FIG. 1 as a distinct component part of computer station 110, it can be implemented by suitable storage resources within processor 130 itself (register, cache, etc.), in nodes of network 120, in other computer stations, or elsewhere. Specifically, memory 140 can include a read only memory (ROM) portion, e.g., for permanently storing program files, and/or a random access memory (RAM) portion for storing data such as variables and operation parameters. It can be physically implemented by any type of volatile and non-volatile, programmable and non-programmable, magnetic, optical, semiconductor and other information storage means conventionally known in the art, for example, hard disk, floppy disk, CD-ROM, DVD, DRAM, SRAM, EPROM, EEPROM, memory stick, etc.

Memory 140 can store software program support modules such as, for example, a basic input/output system (BIOS), an operating system, a program library, a compiler, an interpreter, communication programs, driver, protocol converters, and application software programs (e.g., text processor, browser, database applications, etc.).

The present invention is embodied in a computer program product (CPP) stored in memory 140 and/or in a storage location outside computer workstation 110, e.g., on a separate program carrier 180 that can be inserted in, and read by, input device 160. The CPP generates program signals collectively called a "program".

The CPP provides in a computer readable manner, program code executable by processor 130. The program code is comprised of instructions and, optionally, data and variables. When loaded, the program code causes processor 130 to carry out steps forming one embodiment of a method according to the present invention. A detailed description of the method steps will be given further below. The CPP controls operation of computer station 110 and, if necessary, its interaction with other components of computer system 100. It may be provided as source code in any suitable programming language, e.g., C++, or as object code in a compiled presentation.

Although FIG. 1 illustrates the CPP as stored in memory 140, it may as well be located on program carrier 180 outside computer workstation 110. If the CPP is stored on program carrier 180, input device 160 will be adapted to allow insertion of program carrier 180 into input device 160 to retrieve the CPP. Program carrier 180 can be any computer-readable information carrier medium such as, for instance, a magnetic or optical disk. Instead of storing the program code in memory 140 or on program carrier 180, the CPP can also be provided to processor 130 in the form of program signals delivered through network 120 from a remote computer. The steps embodied by the program code of the CPP can be carried out solely within computer station 110 or in a distributed manner using additional components of computer system 100.

Input device 160 serves to input data and/or instructions for being processed by computer station 110. The term input device encompasses, for example, a keyboard, a pointing device (mouse, trackball, cursor direction keys), a reading device for reading information stored on a separate information carrier (e.g., a drive for reading information from a disk, or a card reader for retrieving data from a memory card), a receiver for receiving information transmitted to computer station 110 from other components of computer system 100 through a wired or wireless link, a scanner, etc.

Output device 170 serves to present in a graphical manner, information resulting from processing activities within computer station 110. Output device 170 can, e.g., include a monitor or display, a plotter, a printer, or the like. Similarly to input device 160, output device 170, while mainly communicating with a user through visual presentation of processing results, may also communicate with other components of computer system 100. Thus, output device 170 may communicate a processing result through a wired or wireless link to a remote recipient.

Input device 160 and output device 170 can be combined in a single device.

Bus 150 and network 120 provide logical and physical connections by conveying instruction and data signals.

While connections and communications within computer workstation 110 are handled by bus 150, connections and communications between different computers stations of computer system 100 and handled by network 120. Network 120 may comprise gateway and router computers dedicatedly programmed to effect data transmission and protocol conversion.

Input and output devices 160, 170 are coupled to computer workstation 110 through bus 150 (as illustrated in FIG. 4) or through network 120 (optionally). While signals inside computer workstation 110 will mostly be electrical signals, signals occurring across network 120 can be any signal type, e.g., electrical, optical, or radio.

Network 120 can be any form of dedicated or public communications network providing wired and/or wireless access and wired and/or wireless signal transmission across network 120. It can, e.g., include the Internet, an intranet (a network linking some or all of the members of a specific group, such as within a company), a LAN, a WAN, a wireless LAN, a public switched telephone network (PSTN), an integrated services digital network (ISDN), or a mobile communications network such as a UMTS (Universal Mobile Telecommunications System), GSM (Global System for Mobile Communication), or CDMA (Code Division Multiple Access) network.

Communication between computers of computer system 100 can be effected using any suitable transmission protocols, mechanisms and data formats. A few examples include Transmission Control Protocol/Internet Protocol (TCP/IP), Hyper Text Transfer Protocol (HTTP), secure HTTP, Wireless Application Protocol (WAP), Unique Resource Locator (URL), Unique Resource Identifier (URI), Hyper Text Markup Language (HTML), Extensible Markup Language (XML), Extensible Hyper Text Markup Language (XHTML), Wireless Application Markup Language (WML), Electronic Data Interchange (EDI), which governs the electronic exchange of business information between or within organizations and their IT (Information Technology) infrastructure in a structured format, an application programming interface (API), etc.

Computer stations 110, 111, 112 . . . are equipped with software systems that include one or more software program applications. Typically, each computer station's software system will be adapted to generate and maintain one or more databases for storing data and variables related to a particular application run by the respective computer station. Each computer station 110, 111, 112 . . . equipped with its associated software system can be referred to as a participant system, or simply participant.

In a typical scenario, participant systems 110, 111, 112 run suitable business program applications that collaborate through exchange of messages to execute a business activity electronically. Network 120 ensures transport and delivery of such messages in an asynchronous fashion. The messages are produced and consumed by the participants' software applications. The number of participants involved in a collaborative business activity will be at least two but can be any number greater than that. Messages sent from one participant can be directed to only one other participant. Alternately, a message can be addressed to more than one other participant, e.g., to all other participants or a selected group of participants, as the particular business activity may require.

A software program application is resident on computer station 110 that includes a program code portion for generating and maintaining one or more data objects DO1, DO2, DO3. Data objects DO1, DO2, DO3 . . . represent business-related information objects such as, e.g., a customer order, a set of financial, budgeting, or accounting figures, a number of items on stock, etc. A modification applied to a respective one of data objects DO1, DO2, DO3 . . . can, e.g., correspond to a change in an order position in a customer order (different quantity, size, color or the like of goods ordered), an update of financial, budgeting, or accounting figures, an updated in the number of items on stock after execution of one or more customer orders, etc. The data of data objects DO1, DO2, DO3 . . . can be any data type and format including scalar data, structured data, or character/string data.

The software program application resident on computer station 110 includes another program code portion for enabling a user to enter a modification of any of data objects DO1, DO2, DO3. For example, this program code portion can be arranged to cause generation of a graphical user interface in which a document is opened that displays the data of a particular one of data objects DO1, DO2, DO3 . . . as presently stored. Entry of a modification can, e.g., be by means of a mouse device and a keyboard of computer station 110. The program may provide for an authorization check to determine whether or not the user is authorized to apply modifications to the particular data object. Of course, many other procedures and formats of entering modifications of data objects DO1, DO2, DO3 . . . are conceivable and available to those skilled in the art, and the invention is not intended to be limited to a particular procedure and format.

Yet another program code portion of the software program application resident on computer station 110 serves for generating and maintaining a status object SO1, SO2, SO3 . . . in relation to each data object DO1, DO2, DO3. Each status object SO1, SO2, SO3 . . . provides a current view of the corresponding data object DO1, DO2, DO3 . . . , wherein the current view reflects any modifications applied to the corresponding data object DO1, DO2, DO3. To this end, each status object SO1, SO2, SO3 . . . may comprise one or more status fields as can be seen from the enlarged view of status object SO1 in FIG. 1. There may be a first status field SF1 in each status object SO1, SO2, SO3 . . . for storing information on a delta value applied to the corresponding data object as a result of one or more modifications. The delta value represents an accrued delta indicating the accumulated change of the respective data object as a result of the one or more modifications. Initially, i.e., upon establishment of the corresponding data object but before a first modification thereof, the delta value is set to zero. Alternatively or additionally, there may be second status field SF2 for storing information on a total value of that data object after application of the one or more modifications. The total value represents an overall metric of the corresponding data object and is initially set to the data object's initial total value.

Optionally, there may be another status field SF3 for storing information on a modification history of the data object associated with the particular status object. The modification history may include a counter indicating the number of modifications entered and/or include a time stamp in relation to every modification indicating the time of entry of the respective modification.

The data objects DO1, DO2, DO3 . . . and the associated status objects SO1, SO2, SO3 . . . are conveniently stored in memory 140 but can be deposited in any other persistent storage location outside computer station 110.

Each time a user of computer station 110 enters a modification of one or more of data objects DO1, DO2, DO3 . . . the program code portion maintaining the status objects SO1, SO2, SO3 . . . effects an update of the corresponding status object(s). Updating involves at least one, and preferably both, of updating the accrued modification delta value stored in status field SF1 and updating the total value stored in status field SF2. Optionally, it may also include updating the modification history stored in status field SF3.

As an example, it is assumed that data object DO1 stores the number of items available on stock with regard to a specific product. Initially, there may be 20 items on stock. Thus, the corresponding status object SO1 will initially be set to (0; 20; . . . ) where "0" indicates the delta value, "20" indicates the total value, and the ellipses stand for any further status elements that may be present in status object SO1 such as the modification history. In case a user operating on data object DO1 from computer station 110 removes five items from the stock, he enters the corresponding modification of data object DO1, causing status object SO1 to be updated to (5; 15; . . . ). Thereafter, two items may be added by the user to the stock, resulting in an update of status object SO1 to (3; 17; . . . ).

Computer system 100 is configured as a distributed system where the same data can be worked on from different computers. To this effect, computer stations 111, 112 . . . store "copies" of one or more of data objects DO1, DO2, DO3 . . . stored on computer station 110 with these copies representing the same data as data objects DO1, DO2, DO3. For example, and as illustrated in FIG. 1, computer station 111 may store a data object DO1' that represents the same data as data object DO1, and computer station 112 may store a data object DO2" representing the same data as data object DO2. Moreover, computer stations 111, 112 may store data objects DO3' and DO3", respectively, representing the same data as data object DO3. Each of computer stations 111, 112 stores a respective status object in relation to each of its data objects. Correspondingly, computer station 111 stores status objects SO1' and SO3', and computer station 112 stores status objects SO2" and SO3".

Because asynchronous messaging is used for communication between computer stations 110, 111, 112 . . . a user accessing a data object on one computer has no real time view of a corresponding data object stored on another computer. To synchronize the various data objects (or data sets), electronic messages are exchanged between users operating on the same data to notify each other of modifications applied to the data. When such a notification message is received by a computer station of a user, the corresponding data object stored on this computer station is adjusted accordingly. In this way, best possible up-to-dateness of all data objects representing the same data can be achieved.

In the following, the present invention will be set forth by way of an exemplary, non-limiting embodiment with reference to the flowchart diagram of FIG. 2 and the graphical presentation depicted in FIG. 3. In this exemplary embodiment, the invention is implemented using the network topology illustrated in, and explained with respect to, FIG. 1. The messaging methodology according to the present invention can be implemented regardless of the structure, format, and type of data that are hosted, stored, processed, etc.

In the exemplary embodiment, modifications are applied to data object DO1 by a user of computer station 110 and notification of these modifications is from computer station 110 to computer station 111. It is to be understood, however, that the principles of the present invention as laid out herein are likewise applicable to the notification of modifications in the opposite direction, i.e., from computer station 111 to computer station 110, between any other pair or group of participants, and in relation to any other data object. Thus, the following description of the exemplary embodiment is by no means intended to be limiting to the scope of the present invention. In particular, notification of modifications of one or more data objects can be from one participant to more than one other participant, for example, to all other participants of computer system 100 or only a part number of other participants. Also, one or more participants other than computer station 110 can be equipped with a computer program product embodying the messaging methodology of the present invention.

Figure 2:
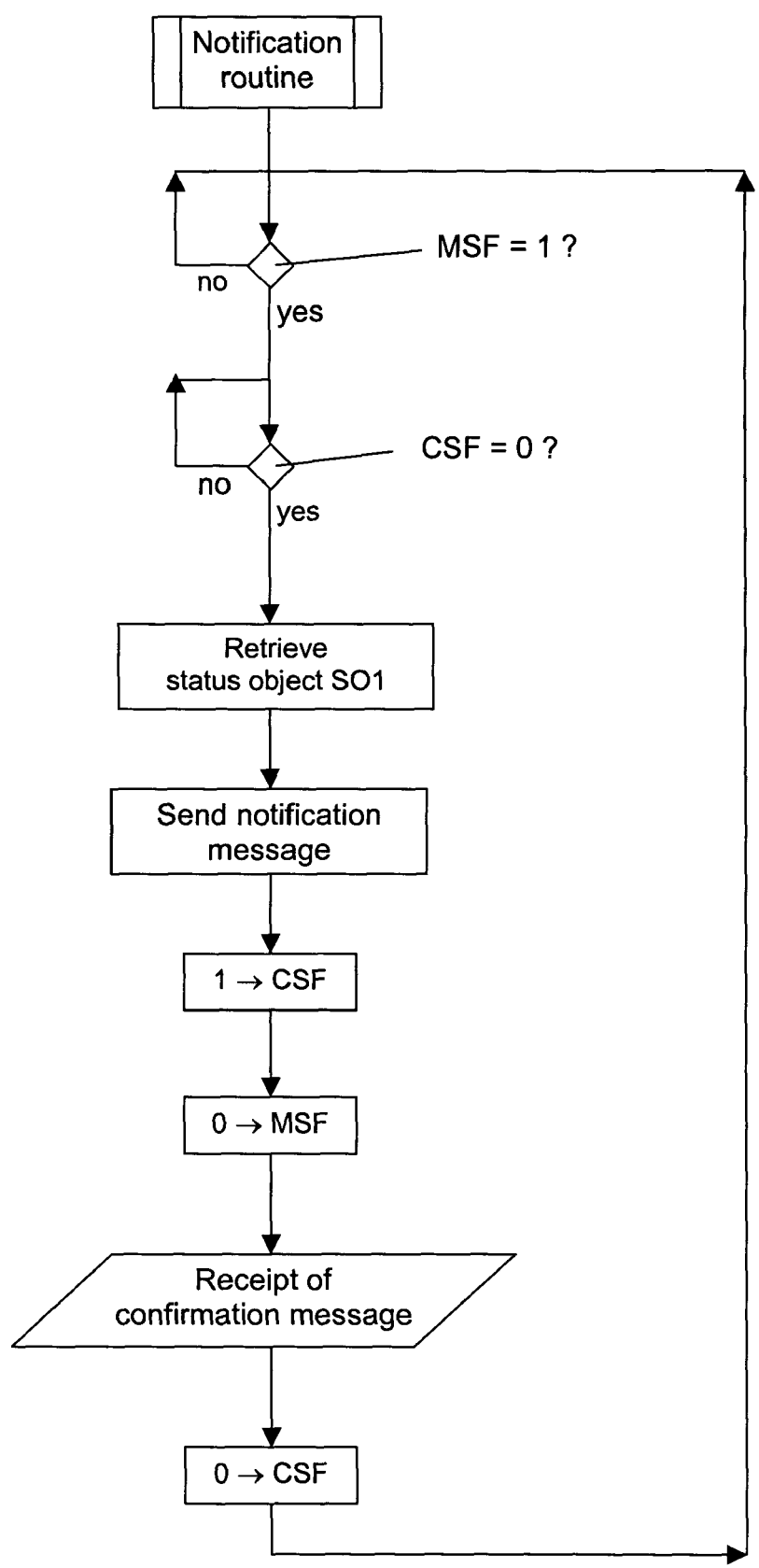
FIG. 2 is a flowchart diagram illustrating a messaging methodology according to one embodiment of the present invention.

FIG. 2 illustrates a routine for a notification process that is executed by processor 130 of computer station 110 under control of the CPP. As indicated in the flowchart diagram of FIG. 2, processor 130 checks a modification status flag MSF provided in relation to data object DO1. This flag is stored in memory 140 or in an internal register of processor 130. It can assume either of two binary values and indicates a modification status of data object DO1. Specifically, in an initial state (i.e., before any modification of data object DO1), flag MSF is set to a value "0" indicating that data object DO1 is unchanged. Upon entry of a first modification of data object DO1, processor 130 sets flag MSF to a value "1" indicating that data object DO1 has been changed. Flag MSF is reset to value "0" only until after a notification message has been sent to computer station 111. If thereafter a further modification of data object DO1 is entered, flag MSF is set again to "1". Setting and resetting of flag MSF is through corresponding control signals generated internally by processor 130.

If it is determined that flag MSF is "0", the routine is not executed further as data object DO1 has not been changed since its generation or since any last notification message. On the other hand, if it is determined that flag MSF is set to "1", this indicates that data object DO1 has been changed and the change needs to be communicated to computer station 111.

Thereafter, the routine advances to check another binary flag called communication status flag CSF. This flag serves to indicate a communication status in relation to modifications applied to data object DO1. Specifically, a value "0" of flag CSF indicates that no notification message in relation to data object DO1 is underway or waiting for acknowledgment by computer station 111. Thus, value "0" of flag CSF indicates a free notification path, allowing computer station 110 to send a notification message to computer station 111. On the other hand, a value "1" of flag CSF indicates a busy notification path, requiring computer station 110 to wait for a confirmation message from computer station 111 before being allowed to send a further notification message.

It is to be understood that when referring to a busy notification path, no physical blockage due to, e.g., overload of network 120 or the like is meant. Rather, flag CSF simply reflects the concept of a pessimistic communication protocol where sending of a notification message is not allowed until confirmation of a previous notification message is received. In this regard, a busy notification path is a mere reference to a situation where a notification message has been sent off by computer station 110 and no acknowledgment of receipt of that notification message by computer station 111 has yet been received on the part of computer station 110.

Flag CSF will also be stored in memory 140 or in an internal register of processor 130. Suitable control signals will be generated by processor 130 to effect setting and resetting of flag CSF.

If it is determined that flag CSF is set to value "1", no new notification message can be created and sent off. Then, the routine enters a waiting loop repeating checking flag CSF, which is only reset to "0" after receipt of a confirmation message from computer station 111 confirming receipt of an earlier notification message. On the other hand, if it is determined that flag CSF is set to "0", processor 130 proceeds by reading status object SO1 and creating a notification message that contains the information read from status object SO1. Thereafter, computer station 110 sends the notification message over network 120 to computer station 111.

The status information packed in a notification message can result from a single change to data object DO1, or from multiple changes. The methodology of the present invention allows a user to enter modifications of data object DO1 regardless of whether or not the notification path from computer station 110 to computer station is busy. As changes made to data object DO1 are accumulated in status object SO1, changes do not need to be communicated to computer station 111 as they are entered. Rather, whenever the notification path from computer station 110 to computer station 111 becomes available, the current status of data object DO1 is retrieved, which reflects all modifications applied up to now.

In the flowchart diagram of FIG. 2, in a next step following sending-off of the notification message, flag CSF is set to value "1", indicating that the notification path from computer station 110 to computer station 111 is busy and cannot be used for sending a further notification message until an acknowledgment is received from computer station 111. At the same time, flag MSF is reset to value "0", indicating that the present (modified) status of data object DO1 has been communicated to computer station 111. As soon as an acknowledgment in the form of a confirmation message is received by computer station 110, flag CSF is also reset to value "0". After a notification message has been successfully sent off, the flow returns to the beginning of the routine to check on flag MSF. If no further modification of data object DO1 has been entered in the meantime by the user, flag MSF will still be set to "0". If, however, the user has made a further change to data object DO1, flag MSF will indicate "1", and the procedure outlined above is executed again.

Figure 3:
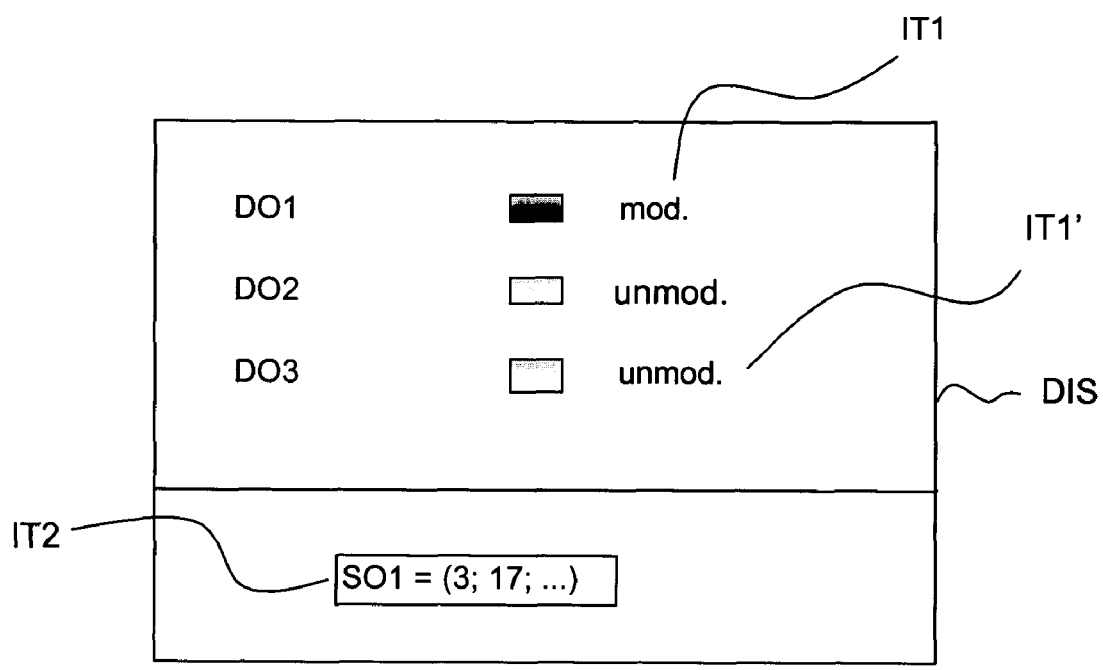
FIG. 3 is a schematic diagram illustrating a graphical user interface as it may be presented to a user of a computer station employed in the computer system of FIG. 1.

FIG. 3 depicts an exemplary graphical user interface that can be presented to the user of computer station 110 on a display DIS of output device 170 under control of the CPP. Display DIS comprises two portions (windows), one for displaying the modification state of data objects DO1, DO2, DO3 . . . and one for displaying these data objects' current status as given by status objects SO1, SO2, SO3. For example, the data object window may present a display item IT1 in relation to every data object of which the modification status flag MSF indicates "1", and present a display item IT1' in relation to every data object of which the modification status flag MSF indicates "0". In the exemplary presentation illustrated in FIG. 3, display items IT1 and IT1' both include a graphical symbol in the form of a small rectangle plus a written remark, but differ from each other, e.g., in the color of the rectangle and the text used for the written remark. In this way, the user can tell with ease from the presentation on the display DIS which data object has been modified and is waiting for being communicated to other participants. Of course, rectangles and text phrases are mere examples of display items that can be used to graphically symbolize modified and unmodified data objects. Many other ways of presenting in a graphical manner, information on the modification and notification status of the data objects are readily available to one skilled in the art.

In the other display window (status object window), a display item IT2 may be presented that indicates the current content of the status object of a data object. Particularly, only one status object may be presented at a time as controlled by the user selecting one of the data objects in the data object window with, e.g., a mouse pointer device.

Whenever a notification message has been sent, processor 130 may cause an update of the presentation in the data object window, and whenever the user enters a modification of a data object, processor may cause an update of the presentation in the status object window if the corresponding status object is presently displayed.

The present invention as implemented in computer system 100 allows changes to be made to a local data object, e.g., a purchase order object, without violating the requirements of a pessimistic communication protocol. It can be viewed as providing a mixed pessimistic/optimistic protocol that supports open communication protocols like RosettaNet externally, i.e., for communication between computer stations 110, 111, 112 . . . while at the same time supporting tolerant and flexible protocols internally, i.e., for entry of modifications locally at each computer station. The invention thus allows to realize and implement a secure and reliable messaging protocol in an open architecture computer system while providing unmatched flexibility and customer friendliness.

While the messaging methodology of the present invention can be used for communication between all participants of a distributed computer system, it is likewise conceivable to employ the messaging methodology of the present invention for communication between some of the participants only and use another communication protocol for communication between other participants. For example, the same sender application may communicate with two receiver applications, using the messaging methodology of the present invention for communication with one of the receiver applications and a pure optimistic protocol for communication with the other receiver application.

While the invention has been described with reference to a preferred embodiment, those skilled in the art will readily appreciate that various changes may be made without departing from the scope of the invention. The invention is therefore intended to include all embodiments that fall within the scope of the appended claims.

The invention claim is:

1. A computer-implemented method of messaging in a computer network, the computer network comprising a plurality of at least two computer-based participant systems communicating through asynchronous exchange of messages, a first one of the participant systems maintaining one or more data objects, the first participant system arranged to send messages to at least one other participant system to notify said other participant system of modifications of said one or more data object entered through the first participant system, the method comprising the steps of:

providing a status object in relation to each data object, the status object comprising one or more status fields for storing information representative of at least one of a delta value applied to the respective data object as a result of one or more modifications and a total value of that data object after application of the one or more modifications;

providing a modification status flag in relation to each data object;

providing a communication status flag in relation to each data object;

each time a modification of a respective data object is entered, updating the respective status object so as to reflect the modification, and checking the respective modification status flag;

if it is determined that the modification status flag indicates a first modification status, setting the modification status flag to a second modification status;

in response to setting the modification status flag to the second modification status, checking the respective communication status flag;

if it is determined that the communication status flag indicates a first communication status, retrieving the respective status object and sending a notification message containing the retrieved status object from the first participant system to the other participant system;

upon sending of the notification message, setting the respective communication status flag to a second communication status and resetting the respective modification status flag to the first modification status; and upon receipt of a confirmation message from the other participant system by the first participant system, resetting the respective communication status flag to the first communication status, the confirmation message confirming receipt of the notification message by the other participant system.

2. The method of claim 1, wherein the step of checking the respective communication status flag includes the step of:

if it is determined that the communication status flag indicates the second communication status, repeating checking the communication status flag until it is determined that the communication status flag indicates the first communication status.

3. The method of claims 1 or 2, further comprising the step of presenting on a display of a graphical output device a first display item in relation to every data object of which the modification status flag indicates the second modification status.

4. The method of claim 3, further comprising the step of presenting on the display of the graphical output device a respective second display item in relation to at least one first display item, the second display item indicating part or all of the information contained in the status object of the corresponding data object.

5. A computer-implemented system for messaging in a computer network, the system comprising a first computer adapted to run one or more software program applications in accordance with inputs, the first computer provided with a computer program product providing computer-executable program code that, when loaded into the computer, causes the first computer to:

provide a status object in relation to each of one or more data objects maintained by said one or more software program applications, the status object comprising one or more status fields for storing information representative of at least one of a delta value applied to the respective data object as a result of one or more modifications entered by a user and a total value of that data object after application of the one or more modifications;

provide a modification status flag in relation to each data object;

provide a communication status flag in relation to each data object;

each time a modification of a respective data object is entered, update the respective status object so as to reflect the modification, and check the respective modification status flag;

if it is determined that the modification status flag indicates a first modification status, set the modification status flag to a second modification status;

in response to setting the modification status flag to the second modification status, check the respective communication status flag;

if it is determined that the communication status flag indicates a first communication status, retrieve the respective status object and send a notification message containing the retrieved status object to at least one second computer;

upon sending of the notification message, set the respective communication status flag to a second communication status and reset the respective modification status flag to the first modification status; and upon receipt of a confirmation message from the second computer, reset the respective communication status flag to the first communication status, the confirmation message confirming receipt of the notification message by the second computer.

6. The system of claim 5, wherein the computer program product further causes the first computer to repeat checking the respective communication status flag if it is determined that the communication status flag indicates the second communication status, until it is determined that the communication status flag indicates the first communication status.

7. The system of claims 5 or 6, wherein the computer program product further causes the first computer to present on a display of a graphical output device a first display item in relation to every data object of which the modification status flag indicates the second modification status.

8. The system of claim 7, wherein the computer program product further causes the first computer to present on the display of the graphical output device a respective second display item in relation to at least one first display item, the second display item indicating part or all of the information contained in the status object of the corresponding data object.

9. A computer program product providing computer-executable instructions that, when executed by a computer, cause the computer to:

provide a status object in relation to each of one or more data objects maintained by one or more software program applications running on the computer, the status object comprising one or more status fields for storing information representative of at least one of a delta value applied to the respective data object as a result of one or more modifications entered by a user of the computer and a total value of that data object after application of the one or more modifications;

provide a modification status flag in relation to each data object;

provide a communication status flag in relation to each data object;

each time a modification of a respective data object is entered, update the respective status object so as to reflect the modification, and check the respective modification status flag;

if it is determined that the modification status flag indicates a first modification status, set the modification status flag to a second modification status;

in response to setting the modification status flag to the second modification status, check the respective communication status flag;

if it is determined that the communication status flag indicates a first communication status, retrieve the respective status object and send a notification message containing the retrieved status object to at least one other computer;

upon sending of the notification message, set the respective communication status flag to a second communication status and reset the respective modification status flag to the first modification status; and upon receipt of a confirmation message from the other computer, reset the respective communication status flag to the first communication status, the confirmation message confirming receipt of the notification message by the other computer.

* * * * *